United States Patent [19]

Nagel et al.

[11] 4,218,032

[45] Aug. 19, 1980

[54] APPARATUS FOR CONVOLUTING WEBS ONTO ROTARY CORES

[75] Inventors: Erich Nagel, Anzing; Wolfgang Zahn, Munich; Heinz Kölbl, Munich; Horst Wildner, Munich; Ernst Ismann, Munich; Siegfried Bartel, Gauting; Ernst Biedermann, Taufkirchen; Karl Dreher, Munich, all of Fed. Rep. of Germany

[73] Assignee: AGFA-Gevaert, A.G., Leverkusen, Fed. Rep. of Germany

[21] Appl. No.: 13,623

[22] Filed: Feb. 21, 1979

[30] Foreign Application Priority Data

Feb. 27, 1978 [DE] Fed. Rep. of Germany ....... 2808445
Oct. 27, 1978 [DE] Fed. Rep. of Germany ....... 2846952

[51] Int. Cl.² .................... G03B 1/04; B65H 75/28
[52] U.S. Cl. ................................ 242/71.1; 242/74; 242/76
[58] Field of Search ............ 242/67.1 R, 71.1, 74, 242/74.1, 74.2, 71.7, 76, 195, 197

[56] References Cited

U.S. PATENT DOCUMENTS

| | | | |
|---|---|---|---|
| 2,236,917 | 4/1941 | Pollock | 242/71.1 |
| 2,702,673 | 2/1955 | Steiner | 242/74 X |
| 2,715,788 | 8/1955 | Gutshall | 242/67.1 R X |
| 3,322,366 | 5/1967 | Hayden | 242/71.1 |
| 3,394,900 | 7/1968 | Gross | 242/67.1 R |
| 3,395,870 | 8/1968 | Klinger | 242/76 X |
| 4,136,839 | 1/1979 | Walter | 242/71.1 |

*Primary Examiner*—Edward J. McCarthy
*Attorney, Agent, or Firm*—Peter K. Kontler

[57] ABSTRACT

Apparatus for convoluting a web of photographic material onto a rotary core in a lighttight cassette has an elongated channel which is pivotably mounted in the cassette and whose outlet is normally tangential to the peripheral surface of the core. The outlet of the channel is detachably or permanently connected with a flexible or deformable strip-shaped element in the form of a link chain, plastic band, textile band or metallic band which surrounds a substantial part of or the entire peripheral surface of the core. When the leader of a web is introduced into and advanced beyond the outlet of the channel while the core rotates in a direction to convolute the web, the foremost part of the leader penetrates between the core and the flexible element and adheres to the peripheral surface of the core not later than upon the making of approximately two convolutions. During winding, the flexible element insures that the neighboring convolutions of the web on the core are tightly packed against each other. When the web is being withdrawn, the flexible element brakes the web and prevents clockspringing of convoluted material.

30 Claims, 8 Drawing Figures

APPARATUS FOR CONVOLUTING WEBS ONTO ROTARY CORES

BACKGROUND OF THE INVENTION

The present invention relates to apparatus for manipulating webs of flexible material, and more particularly to improvements in apparatus for convoluting webs (especially photographic material such as photographic films or photographic paper) onto rotary cores. For example, the apparatus of the present invention can be utilized to convolute a web of photographic paper or the like onto the core of a reel which is confined in the interior of a lighttightly sealed cassette or another container.

It is already known to provide a cassette with a web-admitting elongated guide member which is pivotally installed in the interior of the cassette and whose outlet portion extends substantially tangentially of the rotary core which constitutes or forms part of a takeup reel for photographic paper or other web-like photosensitive material. It is desirable to provide such apparatus with a mechanism which can catch the leader of a web without losses in or damage to the material of the web and thereupon causes the leader to orbit around the axis of the core so that the web is convoluted onto the peripheral surface of the core. It is also desirable to construct the catcher mechanism in such a way that the leader of a web can be introduced with a minimum of effort and within a short interval of time so that the convoluting operation can proceed with a minimum of delay. German Offenlegungsschrift No. 2,445,998 discloses an apparatus which comprises means for attaching the leader of a web to a rotary core. To this end, the pivotable guide member is mounted in the cassette in the aforedescribed manner and its outlet is positioned to direct the foremost part of the leader of a web into one of the spaces between radially extending spokes at the periphery of the core. The spokes are coated with a friction generating material which insures that the leader is entrained by the rotating core when its foremost part extends into the space between two neighboring spokes. A drawback of such apparatus is that the core is rather expensive because it must be provided with spokes and that the spokes must be coated with friction generating material. Furthermore, the mechanism for effecting and controlling the movements of the pivotable guide member is complex and expensive.

OBJECTS AND SUMMARY OF THE INVENTION

An object of the invention is to provide a simple, compact and reliable apparatus for convoluting a web of flexible material, particularly a web of photographic material, onto a rotary core.

Another object of the invention is to provide the apparatus with novel and improved means for attaching the leader of a web to the rotary core to insure that the leader will begin to share rotary movements of the core and that the web will be convoluted onto the core practically immediately after the leader reaches the core.

A further object of the invention is to provide an apparatus wherein the leader need not be deformed as a result of engagement with and adherence to the core.

An additional object of the invention is to provide the apparatus with novel and improved means for preventing clockspringing of convoluted web and for insuring that neighboring convolutions of the web on the core are immediately adjacent to each other.

A further object of the invention is to provide a novel and improved guide member for directing the leader of the web toward and into engagement with the periphery of a rotary core which constitutes or forms part of a takeup reel.

An additional object of the invention is to provide a cassette or another container for photographic web material which embodies the above-outlined apparatus.

Another object of the invention is to provide an apparatus which can be used for automatic collection or convoluting and paying out of photographic web material in photographic processing laboratories or the like.

An ancillary object of the invention is to provide a novel and improved reel for use in an apparatus of the above-outlined character.

A further object of the invention is to provide the apparatus with novel and improved means for biasing the leader of a web against the peripheral surface of a rotating core with a minimum of delay after the leader comes into actual contact with such peripheral surface.

Another object of the invention is to provide the apparatus with novel and improved means for controlling the angular movements of component parts of a takeup reel in the course of a winding or unwinding operation.

The invention is embodied in an apparatus for convoluting a flexible web, particularly for convoluting a web of photographic material in the interior of a container (especially a lighttight cassette for photographic paper or the like). The apparatus comprises a rotary core, an elongated guide member having a web-admitting inlet and a web-discharging outlet, a pivot member or other suitable mounting means for movably supporting the guide member with freedom of movement between a first position in which the outlet is disposed substantially tangentially of the core and a plurality of second or additional positions in which the outlet is located at different distances from the core, and an elongated flexible element (e.g., a link chain, a steel band, a textile band or a plastic band) having a first portion (e.g., one end portion) detachably or fixedly connected to the outlet of the guide member and a second portion at least partially surrounding the core in the first position of the outlet so that the leader of a web which is advanced through and beyond the outlet of the guide member is coiled around the core within the flexible element. This insures that the leader adheres to the core practically immediately after it comes into contact with the core, normally not later than when the leader forms more than one but not more than two convolutions around the core. As the diameter of the convoluted web material increases in response to rotation of the core in a direction to collect the web, the outlet of the guide member moves away from the core and the flexible element overlies the outermost convolution of the growing roll of convoluted web material on the core and furnishes a desirable braking action to thereby insure that the convolutions of the roll are tightly packed, i.e., that neighboring convolutions of the web are immediately adjacent to each other. The apparatus may comprise the aforementioned lighttightly sealed container which then confines the core, the guide member and the flexible element and has an opening which admits the leader of a web into the inlet of the pivotably or otherwise mounted guide member.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
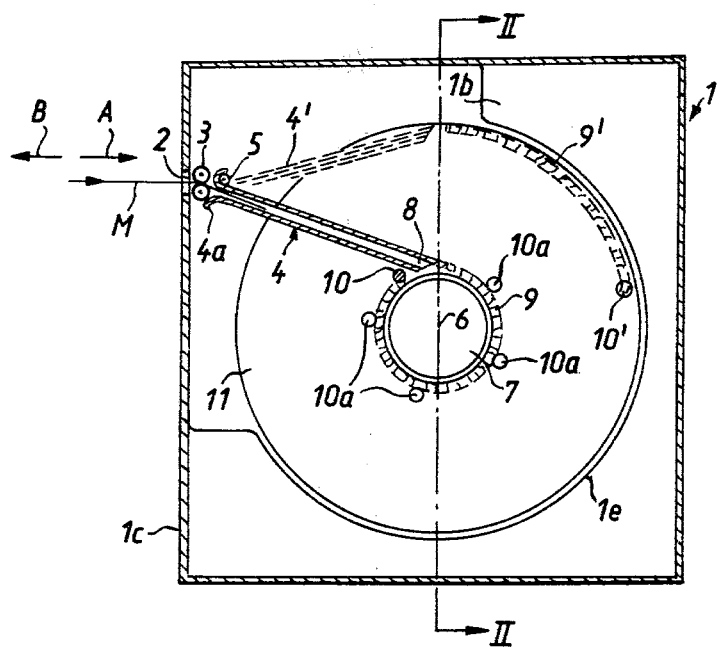
FIG. 1 is a sectional view of an apparatus which includes a lighttight cassette and embodies one form of the invention, the section being taken at right angles to the axis of the core of the takeup reel.
Figure 2:
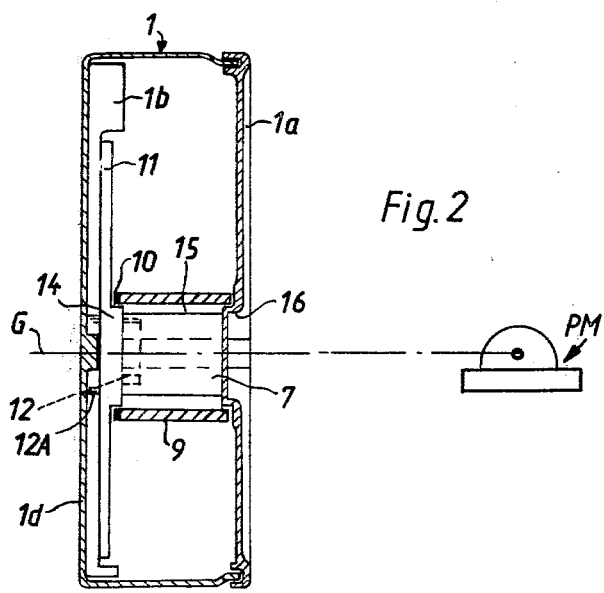
FIG. 2 is a sectional view as seen in the direction of arrows from the line II—II of FIG. 1.

Referring first to FIGS. 1 and 2, there is shown a container or cassette 1 for a web M of photographic paper or the like. One side wall 1c of the cassette 1 has a slot-shaped opening 2 through which the leader of the web M may be fed into the interior of the cassette and by way of which the convoluted web is to be withdrawn. The opening 2 is immediately adjacent to a pair of rolls 3 which constitute a sealing means to prevent penetration of light into the interior of the cassette 1. As shown, the rolls 3 are mounted in the interior of the cassette at the funnel shaped web-admitting inlet 4a of an elongated channel-shaped guide member 4 (hereinafter called channel for short) which is turnable in the interior of cassette 1 about the axis of a mounting means here shown as a pivot pin 5. The axis of the pin 5 is parallel to the axes of the rolls 3, and the rolls 3 are installed between the opening 2 and the pivot pin 5. The axis of the pivot pin 5 is also parallel to the axis 6 of a rotary core 7 forming part of a takeup reel which further includes a magnetizable metallic disk-shaped flange 11. The core 7 is rotatably journalled in the two major walls or panels of the cassette 1. The web-discharging outlet 8 of the channel 4 is connected with a first portion (namely, with one end portion) of an elongated band- or strip-shaped flexible element in the form of a link chain 9. The length of the chain 9 is such that its major second portion can encircle, at least once, the peripheral surface of the core 7. As shown in FIG. 1 by solid lines, the other end portion of the chain 9 forms part of the major (second) portion and is adjacent to the underside of the outlet 8 of the channel 4 when the latter assumes the solid-line (first) position. This other end portion of the chain 9 carries a magnet 10 which is attracted to the metallic flange 11 of the reel including the core 7. The flange 11 is coaxial with and is mounted on the corresponding end portion of the core 7 by a coupling means here shown as a freewheel clutch 12 which causes the flange 11 to share the rotary movement of the core 7 in the clockwise direction, as viewed in FIG. 1, i.e., in a direction to convolute the web M on the core. A second freewheel clutch 12A is interposed between the flange 11 and the adjacent major panel or wall 1d of the cassette 1 to insure that the flange 11 cannot rotate in a counterclockwise direction, as viewed in FIG. 1, i.e., the flange 11 does not rotate when the core 7 is rotated in a direction (counterclockwise, as viewed in FIG. 1) to pay out a convoluted web.

FIG. 2 shows that the central portion of the flange 11 has a collar 14 which is surrounded by the adjacent marginal portion of the chain 9 when the latter is convoluted around the core 7 in a manner as shown in FIG. 1 by solid lines. The collar 14 insures that the chain 9 does not directly contact the peripheral surface of the core 7 so tht the chain (in the solid-line position of FIG. 1) and the peripheral surface of the core 7 define an annular clearance 15 for reception of the leader of the web M when the latter is fed in the direction of arrow A so as to enter the clearance 15 via channel 4. A collar 16 which is mirror symmetrical to the collar 14 is provided at the inner side of the removable second major wall or lid 1a of the cassette 1. The collars 14 and 16 cooperate to insure that the chain 9 and the core 7 define an annular clearance 15 of desired and preferably constant width (as considered radially and axially of the core 7). As shown in FIG. 2, the right-hand marginal portion of the chain 9 contacts the peripheral surface of the collar 16 at the time the left-hand marginal portion contacts the peripheral surface of the collar 14 (it being assumed that the chain 9 is held in the solid-line position of FIG. 1).

The inner side of the major panel or wall 1d of the cassette 1 is further provided with a suitably configurated stop 1b having an arcuate (concave) inner surface 1e which arrests the chain 9 in the outer end position, namely, in a position in which the chain 9 is adjacent to but cannot move radially outwardly beyond the rim of the flange 11. The outermost position of the chain 9 is indicated in FIG. 1 by broken lines, as at 9'. The corresponding end position of the channel 4 (namely, one of a plurality of second positions of the channel 4 in each of which the outlet 8 is located at a different distance from the peripheral surface of the core 7) is also shown by broken lines, as at 4'.

The operation:

The core 7 is set in rotary motion by a prime mover PM which is shown schematically in FIG. 2. The core then rotates in a clockwise direction, as viewed in FIG. 1. As mentioned above, the clutch 12 enables the flange 11 to share the rotary movement of the core 7. The channel 4 assumes the solid-line (first) position of FIG. 1, either by gravity or under the action of a spring (not shown), and the magnet 10 is located close to the periphery of the core 7. Therefore, the chain 9 is automatically convoluted around the core 7 (and more particularly about the collars 14 and 16) to assume the solid-line (first) position of FIG. 1, i.e., the median portion of the chain 9 and the peripheral surface of the core 7 define the annular channel 15. The peripheral surface of the core 7 is preferably made of friction generating material (to this end, the core 7 may be provided with an outer layer of rubber or the like, not specifically shown).

In the next step, the leader of the web M is introduced into the channel 4 via opening 2 in the side wall 1c, the nip of the rolls 3 and the funnel-shaped inlet 4a. The channel 4 (or at least its outlet 8) is tangential or substantially tangential to and communicates with the annular channel 15 because the magnet 10 assumes the position which is shown in FIG. 1 by solid lines and the marginal portions of the chain 9 overlie the collars 14 and 16. As the leader of the web M advances into the clearance 15, it is convoluted around the peripheral surface of the core 7 and begins to adhere to such peripheral surface after forming at least one convolution (normally one-and-a-half or two convolutions) about the peripheral surface of the core 7. This guarantees that the frictional engagement between the convoluted leader of the web M and the peripheral surface of the core 7 is sufficiently strong to enable the core to draw the web into the interior of the cassette 1.

As the diameter of the convoluted web material on the core 7 increases, the outermost convolution of the convoluted web pivots the channel 4 in a counterclockwise direction, as viewed in FIG. 1, and the chain 9 overlies a portion of the outermost convolution, i.e., the chain moves away from the collars 14 and 16. The magnet 10 moves along a spiral path from the core 7 toward the rim of the rotating flange 11. The chain 9 thereby performs a desirable braking action to insure that the neighboring convolutions of the web are tightly draped around each other. When the convoluting operation is completed, the channel 4 assumes the broken-line position 4' of FIG. 1 and the chain 9 assumes the broken line position 9'. Thus, the outermost convolution of the web M is close to the rim of the flange 11.

During unwinding, the web M is pulled in the direction of arrow B shown in FIG. 1. The outlet 8 of the channel 4 then gradually moves from the broken-line position 4' toward the solid-line position of FIG. 1 and entrains the corresponding end portion of the chain 9 radially inwardly. Thus, the chain 9 does not overlie a substantial part of the outermost convolution of the web M in the interior of the casette 1. The prime mover PM is arrested and the core 7 is free to rotate in a conterclockwise direction, as viewed in FIG. 1. The freewheel clutch 12 allows the core 7 to rotate relative to the flange 11, and the freewheel clutch 12A holds the flange 11 against rotation with the core 7. The magnet 10 remains in the outer end position 10' but a certain portion of the chain 9 can overlie the outermost convolution of the web M while the latter is pulled in the direction indicated by arrow B. As a rule, the length of that chain portion which overlies the outermost convolution of the web M while the latter is being withdrawn from the cassette 1 is small or zero so that the resistance which the chain 9 offers to withdrawal of the web M is negligible or zero.

In order to avoid a substantial portion of the chain 9 from remaining in engagement with the outermost convolution of the web M when the diameter of convoluted material in the cassette 1 decreases (e.g., because the cassette 1 is held in such position that the chain 9 tends to move toward the core 7 under the action of gravity), the chain 9 can carry one or more additional magnets (shown in FIG. 1 at 10a) which insure more satisfactory guidance of the chain and further insure that the chain is attracted to the (then) stationary flange 11 while the core 7 pays out the web M. If the additional or auxiliary magnets 10a are provided, the outlet 8 of the channel 4 merely moves the adjacent end portion of the chain toward the core 7 while the diameter of the convoluted web portion in the cassette 1 decreases.

When the web M is fully withdrawn, the flange 11 is rotated clockwise, as viewed in FIG. 1, together with the core 7, whereby the magnet 10 (which adheres to the flange 11) moves toward the solid-line position of FIG. 1 and the chain 9 again surrounds the core 7 in a manner as shown in FIG. 2. The magnet 10 travels gradually from the position 10' to the position which is shown in FIG. 1 by solid lines. Such movement of the magnet is completed after not more than 1-2 revolutions of the flange 11.

Figure 3:
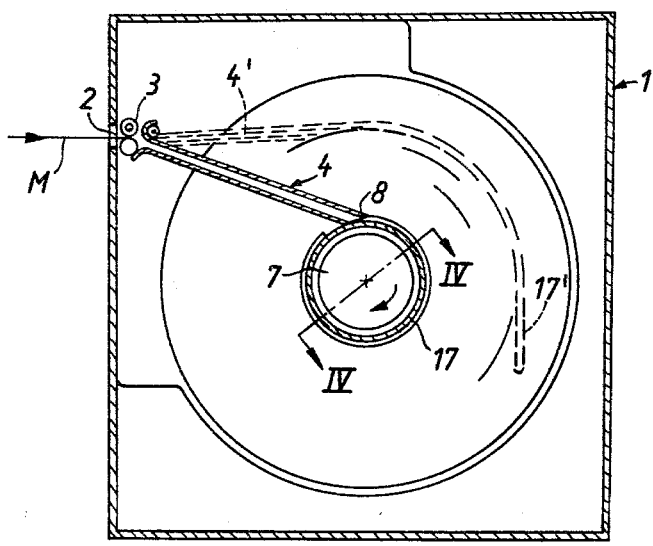
FIG. 3 is a sectional view which is similar to that of FIG. 1 but shows a modified convoluting apparatus.
Figure 4:
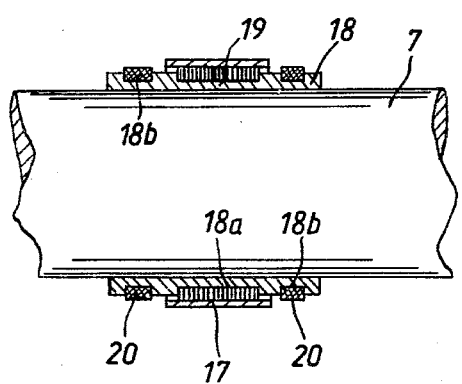
FIG. 4 is an enlarged fragmentary sectional view as seen in the direction of arrows from the line IV—IV of FIG. 3.

FIGS. 3 and 4 illustrate a second apparatus which constitutes a modified version of the apparatus of FIGS. 1 and 2. All such parts of the second apparatus which are identical with or clearly analogous to the apparatus of FIGS. 1 and 2 are denoted by similar reference characters. The outlet 8 of the guide member or channel 4 is connected with a flexible element in the form of a metallic band 17 which may consist of spring steel and whose length equals or approximates the circumferential length of the peripheral surface of the core 7. As shown in FIG. 4, the median portion of the periphery of the core 7 is surrounded by and rotates with a sleeve 18 having a ring-shaped external recess or groove 18a for an annular magnet 19 which is in register with the flexible metallic band 17. The axial length of the magnet 19 is less than (e.g., one-half of) the axial length of the sleeve 18. FIG. 4 further shows that the marginal portions of the magnet 19 are flanked by rubber rings 20 portions of which are recessed into circumferential grooves 18b of the sleeve 18.

The core 7 is driven in a clockwise direction in a manner similar to that shown in FIG. 2 (i.e., it can receive torque from a suitable prime mover). The channel 4 is then held in the solid-line position of FIG. 3, and the magnet 18 attracts the flexible band 17 in a manner as shown in FIG. 4. The leader of the web M is fed into the channel 4 and advances between the external surface of the magnet 19 and the friction-generating external surfaces of the rings 20 on the one hand, and the internal surface of the flexible band 17 on the other hand. Once the leader of the web M forms approximately one and one-half convolutions around the parts 19 and 20, it (indirectly) adheres to the core 7 with a requisite force so that the latter can draw the web into the cassette 1 as long as it continues to rotate in a clockwise direction, as viewed in FIG. 4. When the convoluting operation is completed, the channel 4 assumes the broken-line position 4' and the flexible band 17 assumes the broken-line position 17' of FIG. 3. The band 17 performs a desirable braking action during movement from the solid-line position to the broken-line position 17' to thus insure that the neighboring convolutions of the web M in the cassette 1 are immediately adjacent to each other.

During withdrawal of the web M from the cassette 1, the channel 4 moves from the position 4' toward the solid-line position by gravity or under the action of a spring and entrains the respective end portion of the band 17 so that the latter is attracted to the magnet 19 when the leader of the web M (namely, the innermost convolution of the web) is withdrawn from the cassette 1 via channel 4. If the cassette 1 is held in the position of FIG. 3, the movement of the band 17 from the position 17' toward the solid-line position of FIG. 3 or 4 is assisted or caused by gravity. Also, the lid of the cassette 1 can be removed and the band 17 can be manually returned to the position of FIG. 4.

It is clear that the apparatus of FIGS. 3 and 4 is susceptible of many modifications. For example, the band 17 may consist of any suitable ferromagnetic material (i.e., not necessarily of steel). It is further within the purview of the invention to utilize a band 17 which consists of any suitable material (e.g., textile or synthetic plastic material) whose inner side is provided with a layer or film of ferromagnetic material which can be attracted by the annular magnet 19. Still further, particles of ferromagnetic material can be embedded in a synthetic plastic band. Also, the band 17 may carry magnets, and the annular magnet 19 is then replaced by a steel ring or a ring consisting of or containing another suitable ferromagnetic material which can attract the magnets on the band 17. This would be tantamount to using the chain 9 in the apparatus of FIGS. 3 to 4 (plus replacing the magnet 17 with a ferromagnetic annulus).

Figure 5:
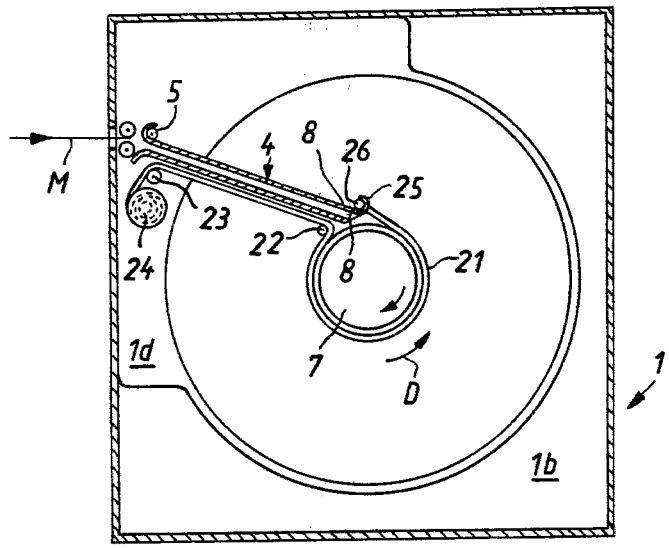
FIG. 5 is a sectional view which is similar to that of FIG. 1 but shows a further convoluting apparatus.
Figure 6:
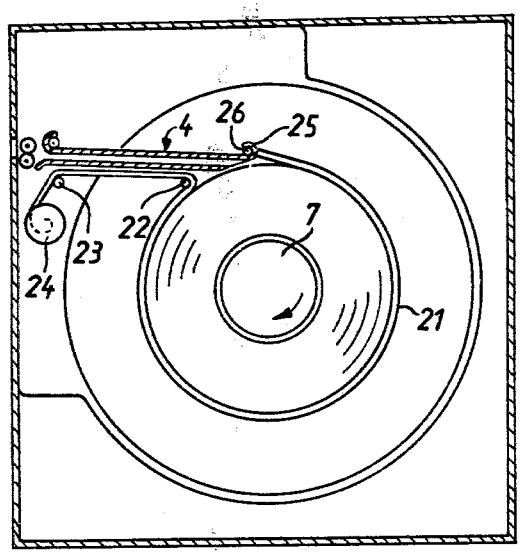
FIG. 6 is a similar sectional view of the further apparatus.

FIGS. 5 and 6 illustrate a third apparatus wherein all such parts which are identical with or clearly analogous to corresponding parts of the apparatus of FIGS. 1 and 2 are denoted by similar reference characters. The outlet 8 of the channel 4 is detachably connected to one end portion of a flexible element constituting a band or strip of any suitable material (e.g., a synthetic plastic substance or textile) which is trained over the major part of or over the entire (or almost entire) core 7 by a guide roll 22 which is secured to the outlet 8. The band 21 is further trained over a guide roll 23 which is adjacent to the pivot 5, and the other end portion of the band is connected to a winding or coiling device 24 of any known design which can rotate clockwise or counterclockwise, as viewed in FIG. 5. The coiling device 24 may constitute or comprise a helical torsion spring one end portion of which is anchored in the wall 1d of the cassette 1 and the other end portion of which is attached to the respective end portion of the band 21. The torsion spring 24 has a tendency to wind itself around the fixedly mounted end portion and to thereby tension the band 21. When the spring 24 collects the band 21, it coils itself in a counterclockwise direction, as viewed in FIG. 5. The band 21 advances in the direction of arrow D when the diameter of the convoluted web in the cassette 1 increases.

The leader of the web M is fed into the channel 4 while the core 7 of the reel in the cassette 1 rotates in a clockwise direction, as viewed in FIG. 5. The foremost part of the web M thereby penetrates between the peripheral surface of the core 7 and the inner side of the band portion between the outlet 8 and roll 22. When the friction factor $e^{\mu a}$ between the innermost convolution and the next convolution of the leader of the web M between the peripheral surface of the core 7 and the inner surface of the band 21 reaches a predetermined value, the core 7 can start to draw the web M into the cassette 1. Such situation arises when the leader of the web M forms approximately 1½ convolutions around the core 7. This completes the catching phase and marks the start of the winding or collecting stage. The torsion spring 24 insures that the band 21 hugs the outermost convolution of the web M in the casette 1 (see FIG. 6), i.e., the band portion between the outlet 8 and roll 22 performs a desirable braking action which insures that the neighboring convolutions of the web M are closely adjacent to each other.

When the winding operation is completed and the web M is to be withdrawn from the cassette 1, the diameter of the arcuate portion of the band 21 between the outlet 8 and the roll 22 decreases while the outlet 8 moves radially inwardly toward the peripheral surface of the core 7.

In many instances, it is desirable to remove the entire convoluted web M from the interior of the cassette 1. This presents no problems in the embodiments of FIGS. 1–2 and 3–4 because, once the lid 1a is removed, the person in charge simply moves the chain 9 or the band 17 away from the outermost convolution of the roll of convoluted web and removes such roll from the interior of the cassette. In order to allow for such removal of an entire roll of convoluted web from the cassette 1 of FIGS. 5 and 6, the band 21 is detachable from the outlet 8 of the channel 4. To this end, the outlet 8 is provided with one element of a disengageable coupling the other element of which is provided on the adjacent end portion of the band 21. The one coupling element is shown in the form of a bifurcated hook 25 on the outlet 8, and the other element of the coupling is a rod 26 which is attached to or forms part of the adjacent end portion of the band 21 and can be readily inserted into or withdrawn from the hook. This coupling can be rapidly and conveniently disengaged by hand to allow for removal of a full roll of convoluted web material from the cassette 1 of FIGS. 5 and 6.

The coiling device 24 is remote from the core 7 so that it does not interfere with the convoluting operation.

Figure 7:
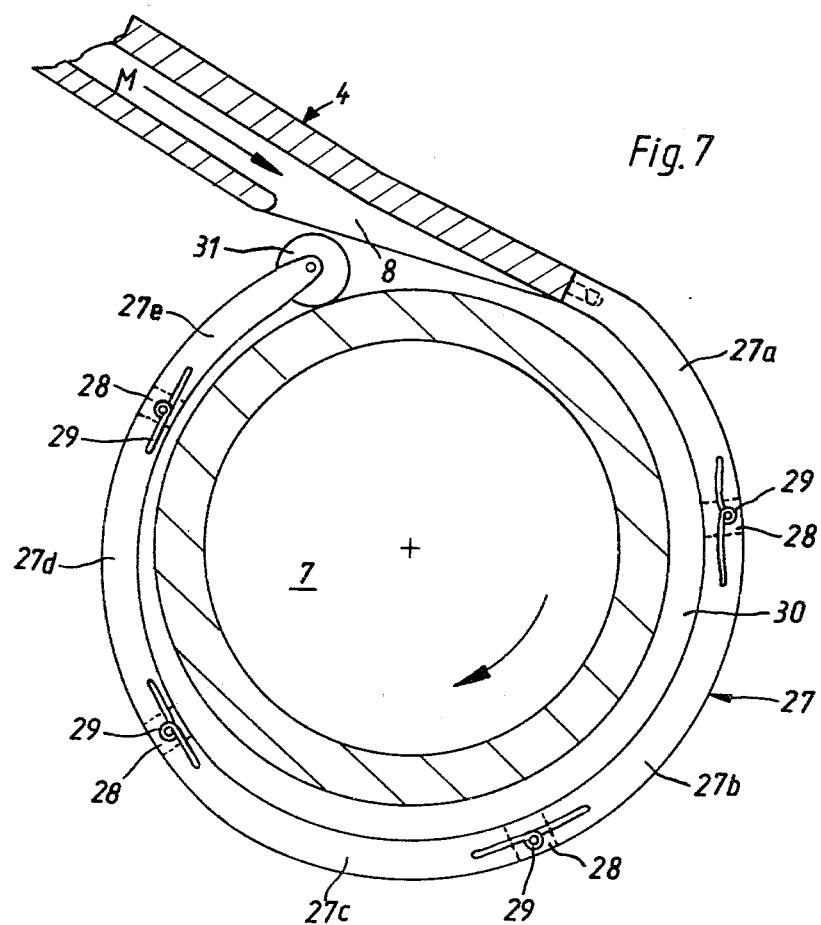
FIG. 7 is an enlarged fragmentary sectional of still another apparatus.

FIG. 7 shows a portion of a fourth apparatus wherein only the catching mechanism and the core of the reel are shown in detail. The outer side of the outlet 8 of the channel 4 (as considered radially of the core 7) is articulately connected to one end portion of a flexible element here shown as a chain 27 including arcuate links 27a, 27b, 27c, 27d, 27e. The links are actually plates whose radii of curvature only slightly exceed the radius of the core 7. The neighboring links of the chain 27 are articulately connected to each other by hinges 28. The mounting of hinges 28 is such that they allow the articulately interconnected links 27a–27e to pivot in one direction with respect to the positions shown in FIG. 7 but not in the other direction. For example, the hinge 28 between the links 27a and 27b prevents the link 27b from pivoting clockwise beyond the position of FIG. 7 but allows the link 27b to pivot counterclockwise so as to move away from the peripheral surface of the core 7. In other words, the radius of curvature of a composite annulus consisting of two or more links 27a–27e cannot be reduced below the radius of curvature of any single link. When the chain 27 assumes the position of FIG. 7, its links 27a–27e define with the core 7 an annular clearance 30.

The pintles of the hinges 28 carry biasing means in the form of hairpin springs 29 which tend to reduce the diameter of the chain 27, i.e., which tend to maintain the links 27a–27e in the positions shown in FIG. 7. The free end of the last link 27e (end portion of the chain 27) carries a pressure roll 31 which bears against the peripheral surface of the core 27 under the bias of the spring 29 which is associated with the hinge 28 between the links 27d and 27e.

When the leader of the web M is introduced into the clearance 30 while the core 7 rotates in a clockwise direction, as viewed in FIG. 7, the foremost part of the leader reaches and is engaged by the roll 31 so that it is urged against the adjacent portion of the core. This takes place after the leader forms a single convolution around the core 7. The latter then entrains the web M and causes it to form a series of successive convolutions whereby the links 27a–27e of the chain 27 pivot with respect to each other and move away from the peripheral surface of the core. The friction factor which suffices to enable the core 7 to draw the web M through the channel 4 is reached when the leader of the web forms approximately 1½ convolutions around the peripheral surface of the core. As the chain 27 expands, the channel 4 pivots counterclockwise, i.e., its outlet 8 moves substantially radially of and away from the peripheral surface of the core. The roll 31 bears against successive outermost convolutions of the web in the gradually widening clearance 30.

Figure 8:
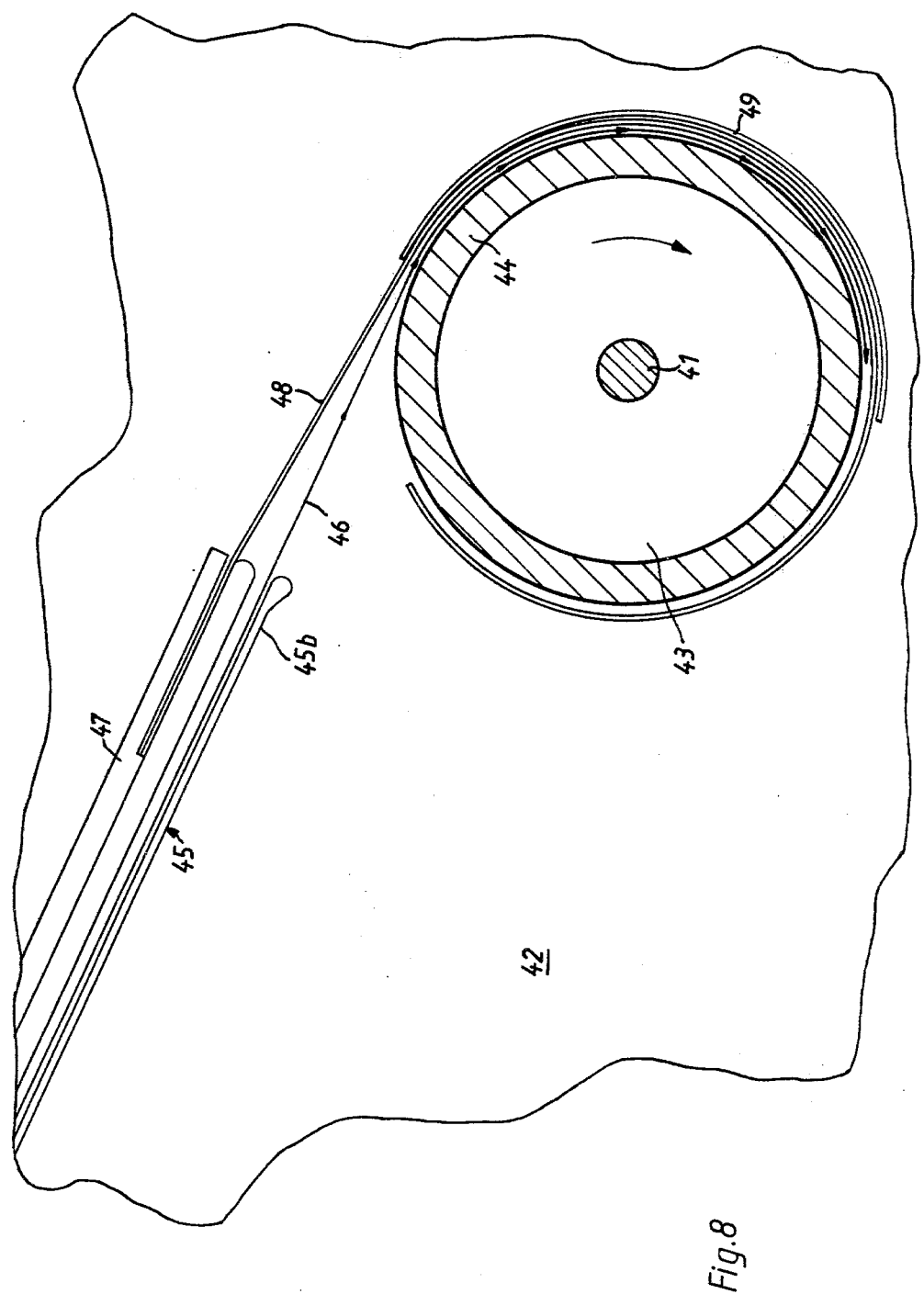
FIG. 8 is an enlarged fragmentary sectional view of an additional convoluting apparatus.

The apparatus of FIG. 8 comprises a driven spindle 41 which carries a core 44 consisting of cardboard or the like. The core 44 is installed in a cassette or container 42 only one major wall of which is shown in FIG. 8. The core 44 is removably slipped onto a cylindrical support 43 which is driven by the spindle 41. The means for driving the spindle 41 comprises a suitable prime mover or transmission or crank handle, not shown.

When the cassette 42 is empty, the channel 45 extends substantially tangentially of the core 44. As in the previously described embodiments, the channel 45 is pivoted to the cassette 42 in the region of its inlet which is not shown in FIG. 8. Thus, the outlet 45b of the channel 45 moves radially outwardly when the diameter of convoluted web material on the core 44 increases. The outlet 45b of the channel 45 supports or includes a rigid carrier 47 which is connected with one end of a resilient flexible band 48 of steel or the like. The band 48 is relatively thin, e.g., between 0.2–0.4 mm and preferably approximately 0.3 mm. Its length is selected in such a way that, when no convoluted web material surrounds the core 44, the band 48 surrounds the major part (e.g., between 75 and 100 percent, preferably about 85 percent) of the core. A second resilient metallic band 49 which is thicker than the band 48 (e.g., the thickness of the band 49 may be between 0.45 and 0.6 mm, preferably approximately 0.5 mm) also surrounds a portion of the core 44. One end portion of the band 49 is located in the region where the band 48 extends tangentially from the core 44. From such location, the band 49 extends clockwise, as viewed in FIG. 8, and surrounds approximately one-half of the core 44. The bands 49 and 48 respectively constitute the outer and inner components of a composite flexible element.

The operation of the apparatus which includes the structure of FIG. 8 is as follows:

The leader of the web 46 is introduced through the opening (not shown) of the cassette 42 and advances in the channel 45 toward the peripheral surface of the rotating core 44. The latter is driven by the spindle 41 via support 43 so that it rotates in a clockwise direction, as viewed in FIG. 8. The peripheral surface of the core 44 is roughened or otherwise treated or configurated to insure the establishment of satisfactory frictional engagement between the leader of the web 46 and the core. For example, the core 44 may include a thin peripheral layer of rubber or elastomeric synthetic plastic material. Alternatively, the peripheral surface of the core 44 may be formed with two circumferential grooves for reception of portions of two rubber rings in a manner similar to that shown for the sleeve 18 and rings 20 of FIG. 4. The thin band 48 causes the leader of the web 46 to move around and to engage the peripheral surface of the rotating core 44. Thus, the band 48 is actually a catcher band which insures that the leader of the web 46 will be convoluted around and will adhere to the core. The outer band 49 enhances the stiffness of the inner band 48 in that region where the band 48 is to catch and deflect the leader of the web 46. As the diameter of convoluted web material on the core 44 increases, the bands 48 and 49 yield but the band 49 continues to prevent excessive deformation of the band 48 so that the latter generates a certain braking action which insures that the convolutions of the web in the cassette 42 are tightly packed, i.e., immediately adjacent to each other.

During unwinding, the web 46 is pulled outwardly through the channel 45 whose outlet 45b is then remote from the core 44 but moves substantially radially of the core toward the position of FIG. 8 as the diameter of the convoluted web material decreases. The core 44 then rotates in a counterclockwise direction and the band 48 acts not unlike a brake to prevent clockspring-ing of the convoluted material in the cassette during withdrawal of the web.

It will be readily appreciated that a cassette or another container is not a critical component of the improved apparatus. Thus, the apparatus can be used with equal advantage for collecting webs on cores which are not confined in cassettes, and the web need not constitute photographic paper or other photosensitive material. For example, the apparatus could be used in projectors to convolute the leader of a web of exposed and developed motion picture film onto the core of a takeup reel.

An important advantage of the improved apparatus is that the leader of the web can be attached to the peripheral surface of an inexpensive core (e.g., a simple hollow cylinder consisting of cardboard or the like) in a simple, time-saving and reliable manner. The foremost part of the leader of a web adheres to the peripheral surface of such core after the leader forms a little more than one convolution, normally not more than 1½ convolutions. Moreover, the threading operation is extremely simple because all that is necessary is to feed the leader into and through the guide member or channel whereby the leader automatically finds its way into requisite frictional engagement with the peripheral surface of the core or with one or more parts (such as the rings 20) which share the rotary movements of the core.

Another important advantage of the improved apparatus is that the leader need not be deformed at all as a result of engagement with and entrainment by the core. Thus, and referring again to the aforediscussed prior art apparatus whose core has spokes coated with friction-generating material, the foremost part of the leader of the web is deformed when it penetrates into a space between two neighboring spokes, i.e., such foremost part extends radially inwardly toward the axis of the core whereas the remaining part of the web is coiled around the tips of the spokes. In the apparatus of the present invention, the foremost part of the leader of a web M or 46 lies flat against the peripheral surface of the core so that such foremost part need not be straightened or removed before the leader of the web (upon unwinding from the core) is ready for threading into the next apparatus, e.g., in a photographic processing laboratory or the like.

A further important advantage of the improved apparatus is that the guide member automatically moves between the first position in which its outlet is substantially tangential to the core and any one of a plurality of aforementioned second or additional positions in which the outlet is located at different distances from the peripheral surface of the core, depending on the diameter of the outermost convolution of convoluted web on the core. This is also in contrast to the construction and mode of operation of the aforediscussed conventional apparatus wherein the movements of the outlet of the guide member must be controlled by specially designed means while the diameter of convoluted web material increases or decreases.

An additional advantage of the improved apparatus is also attributable to the fact that the foremost part of the leader of a web need not be deformed when such foremost part engages the rotating core. Thus, when the core is rotated in a direction to pay out the web, the resistance of the web to withdrawal from the cassette or to detachment from the core does not increase at the very end of the unwinding operation because the entire leader of the web lies flat against the periphery of the core.

As mentioned above, the flexible element or elements of the improved apparatus invariably furnish or can furnish a desirable braking action upon the web during convoluting of the web. However, the flexible element can also generate a braking action during unwinding. Therefore, the convolutions of the growing roll of web on the core are tightly packed during winding and the roll of convoluted web material is held against clock-springing during unwinding. Thus, the flexible element replaces the specially designed braking devices of conventional web winding or convoluting apparatus. In other words, the flexible element performs or can perform a number of different functions including automatic guidance of the foremost part of the leader of a web into satisfactory and prompt frictional engagement with the peripheral surface of the core, desirable braking action during winding, and desirable braking action during withdrawal of the web from the roll on the core of the takeup reel.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; an elongated flexible link chin having first and second end portions, a first portion constituting one of said end portions and connected with said outlet and a second portion including the other of said end portions and at least partially surrounding said core in said first position of said outlet so that the leader of a web which is advanced through and beyond said outlet is coiled around said core within said link chain; a rotary flange consisting at least in part of magnetizable material and adjacent to one axial end of said core; and a magnet provided on said chain in the region of said other end portion and yieldably adhering to said flange.

2. Apparatus as defined in claim 1, wherein said link chain is provided with a plurality of spaced-apart additional magnets as considered in the circumferential direction of said core when said link chain surrounds said core, said flange being metallic and coaxial with said core and said magnets being sufficiently close to said flange to attract the respective parts of said link chain to the flange.

3. Apparatus as defined in claim 1, further comprising a collar surrounding said core and adjacent to one marginal portion of said link chain when the chain surrounds said core so that the strip and the core define an annular clearance which communicates with said outlet in said first position of said outlet to permit entry of the leader of a web into said clearance.

4. Apparatus as defined in claim 1, wherein said core is rotatable in a first direction to convolute the web therearound and in a second direction to pay out the convoluted web, said flange being coaxial with said core and futher comprising means for coupling said core to said flange so as to compel said flange to share the rotary movement of said core in said first direction.

5. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; an elongated flexible element consisting at least in part of ferromagnetic material and having a first portion connected with said outlet and a second portion at least partially surrounding said core in said first position of said outlet so that the leader of a web which is advanced through and beyond said outlet is coiled around said core within said flexible element; and magnet means provided on said core and attracting said flexible element.

6. Apparatus as defined in claim 5, wherein said magnet means comprises an annular magnet at least partially surrounding said core.

7. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; an elongated flexible band having two end portions, a first portion constituting one of said end portions and connected with said outlet and a second portion including the other of said end portions and at least partially surrounding said core in said first position of said outlet so that the leader of a web which is advanced through and beyond said outlet is coiled around said core within said flexible band; and means for yieldably biasing said second portion of said band toward the periphery of said core.

8. Apparatus as defined in claim 7, wherein said biasing means comprises a coiling device connected with said other end portion and operative to convolute said second portion to thereby urge the second portion toward said core.

9. Apparatus as defined in claim 7, further comprising means for detachably coupling said one end portion to said outlet.

10. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; and an elongated flexible element having a first portion connected with said outlet and a second portion at least partially surrounding said core in said first position of said outlet so that the leader of a web which is advanced through and beyond said outlet is coiled around said core within said flexible element, said flexible element including a plurality of arcuate links having radii of curvature approximating the radius of said core and means for articulately connecting the neighboring links to each other.

11. Apparatus as defined in claim 10, wherein said flexible element further comprises means for yieldably biasing said links to positions in which said links form at least a portion of an annulus whose radius equals said radii of curvature.

12. Apparatus as defined in claim 10, wherein said flexible element includes a first and a second end portion, said first portion constituting one of said end portions and one part of said second portion constituting the other end portion of said flexible element, said flexible element further comprising a pressure roll providing in the region of said other end portion and bearing against said core in the absence of web material between said core and said flexible element.

13. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; and an elongated flexible element having a first portion connected with said outlet and a second portion at least partially surrounding said core in said first position of said outlet so that the leader of a web which is advanced through and beyond said outlet is coiled around said core within said flexible element, said flexible element comprising a relatively stiff first component and a more readily flexible second component disposed between said first component and said core.

14. Apparatus as defined in claim 13, wherein said second component and the peripheral surface of said core define a substantially annular clearance which communicates with the outlet of said guide member in said first position of said outlet so that the leader of a web which is advanced beyond said outlet enters said clearance and contacts said peripheral surface.

15. Apparatus as defined in claim 13, wherein said first component is shorter than said second component, as considered in the circumferential direction of said core.

16. Apparatus as defined in claim 15, wherein said first component has an end portion adjacent to said outlet.

17. Apparatus as defined in claim 13, wherein said second component surrounds between 75 and 100 percent of the peripheral surface of said core in the absence of web material between said peripheral surface and said second component.

18. Apparatus as defined in claim 17, wherein said first component surrounds approximately one-half of said peripheral surface in the absence of web material between said core and said second component.

19. Apparatus as defined in claim 13, wherein the thickness of said second component is between 0.2 and 0.4 mm.

20. Apparatus as defined in claim 19, wherein the thickness of said first component is between 0.45 and 0.6 mm.

21. Apparatus as defined in claim 13, wherein the thickness of said first component is approximately 0.5 mm and the thickness of said second component is approximately 0.3 mm.

22. Apparatus as defined in claim 13, wherein at least a portion of said core consists of cardboard.

23. Apparatus as defined in claim 22, wherein said core has a peripheral surface at least a portion of which has a high coefficient of friction to reduce the likelihood of slippage of the leader of a web with respect to such surface.

24. Apparatus for convoluting a flexible web, particularly for convoluting a web of photographic material in the interior of a container, comprising a rotary core which is rotatable in a first direction to convolute the web therearound and in a second direction to pay out the convoluted web; an elongated guide member having a web-admitting inlet and a web-discharging outlet; mounting means for supporting said guide member with freedom of movement between a first position in which said outlet is disposed substantially tangentially of said cord and a plurality of second positions in which said outlet is located at different distances from said core; an elongated flexible element having a first portion connected with said outlet and a second portion at least partially surrounding said core in said first position of said outlet so that the leader of a web which is advanced through and beyond said outlet is coiled around said core within said flexible element; a rotary flange coaxial with and adjacent to one axial end of said core; means for coupling said core to said flange so as to compel said flange to share the rotary movement of said core in said first direction; and means for holding said flange against rotation in said second direction.

25. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; an elongated flexible element having a first portion connected with said outlet and a second portion at least partially surrounding said core in said first position of said outlet so that the leader of a web which is advanced through and beyond said outlet is coiled around said core within said flexible element; an annular member surrounding said core and consisting at least in part of ferromagnetic material; and a plurality of magnets provided on said second portion of said flexible element to attract the latter to said annular member.

26. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; an elongated flexible element having a first portion connected with said outlet and a second portion at least partially surrounding said core in said first portion of said outlet so that the leader of a web which is advanced through and beyond said outlet is coiled around said core within said flexible element; and at least one ring-shaped friction generating member surrounding said core within said flexible element to frictionally engage the leader of a web which is introduced between said core and said flexible element.

27. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; an elongated flexible band having two end portions, a first portion constituting one of said end portions and connected with said outlet and a second portion including the other of said end portions and at least partially surrounding said core in said first position of said outlet so that the leader of a web which is advanced through and beyond said outlet is coiled around said core within said flexible band; and means for yieldably biasing said second portion of said band toward the periphery of said core, said biasing means comprising a coiling device connected with said other end portion and operative to convolute said second portion to thereby urge the second portion toward said core, said coiling device being remote from said core so as not to interfere with convolution of the web around the core within said second portion of said band.

28. Apparatus for convoluting a flexible web, particularly for convoluting a web of photographic material in the interior of a container, comprising a rotary core; an elongated guide member having a web-admitting inlet and a web-discharging outlet, said outlet comprising a roll; mounting means for supporting said guide member with freedom of movement between a first position in which said outlet is disposed substantially tangentially of said core and a plurality of second positions in which said outlet is located at different distances from said core; an elongated flexible band having two end portions, a first portion constituting one of said end portions and connected with said outlet and a second portion including the other of said end portions and at least partially surrounding said core in said first position of said outlet so that the leader of a web which is advanced through and beyond said outlet is coiled around said core within said flexible band; and means for yieldably biasing said second portion of said band toward the periphery of said core, said biasing means comprising a coiling device connected with said other end portion and operative to convolute said second portion to thereby urge the second portion toward said core, said second portion of said band being trained over said roll intermediate said one end portion and said coiling device.

29. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; an elongated flexible band having two end portions, a first portion constituting one of said end portions and connected with said outlet and a second portion including the other of said end portions and at least partially surrounding said core in said first position of said outlet so that the leader of a web which is advanced through and beyond said outlet is coiled around said core within said flexible band; and means of yieldably biasing said second portion of said band toward the periphery of said core, said biasing means comprising a coiling device connected with said other end portion and operative to convolute said second portion to thereby urge the second portion toward said core, said coiling device comprising a torsion spring.

30. Apparatus for convoluting a flexible web, particularly for convoluting a web of photographic material in the interior of a container, comprising a rotary core; an elongated guide member having a web-admitting inlet and a web-discharging outlet; mounting means for supporting said guide member with freedom of movement between a first position in which said outlet is disposed substantially tangentially of said core and a plurality of second positions in which said outlet is located at different distances from said core; and an elongated flexible element having a first portion connected with said outlet and a second portion at least partially surrounding said core in said first position of said outlet so that the leader of a web which is advanced through and beyond said outlet is coiled around said core within said flexible element, said flexible element including a plurality of arcuate links having radii of curvature approximating the radius of said core, means for articulately connecting the neighboring links to each other and means for yieldably biasing said links against the outermost convolution of the web on said core, said flexible element and said core defining an annular clearance which communicates with said outlet in the first position of said outlet to receive the leader of a web when such leader is advanced beyond said outlet.

* * * * *